Figure 1:
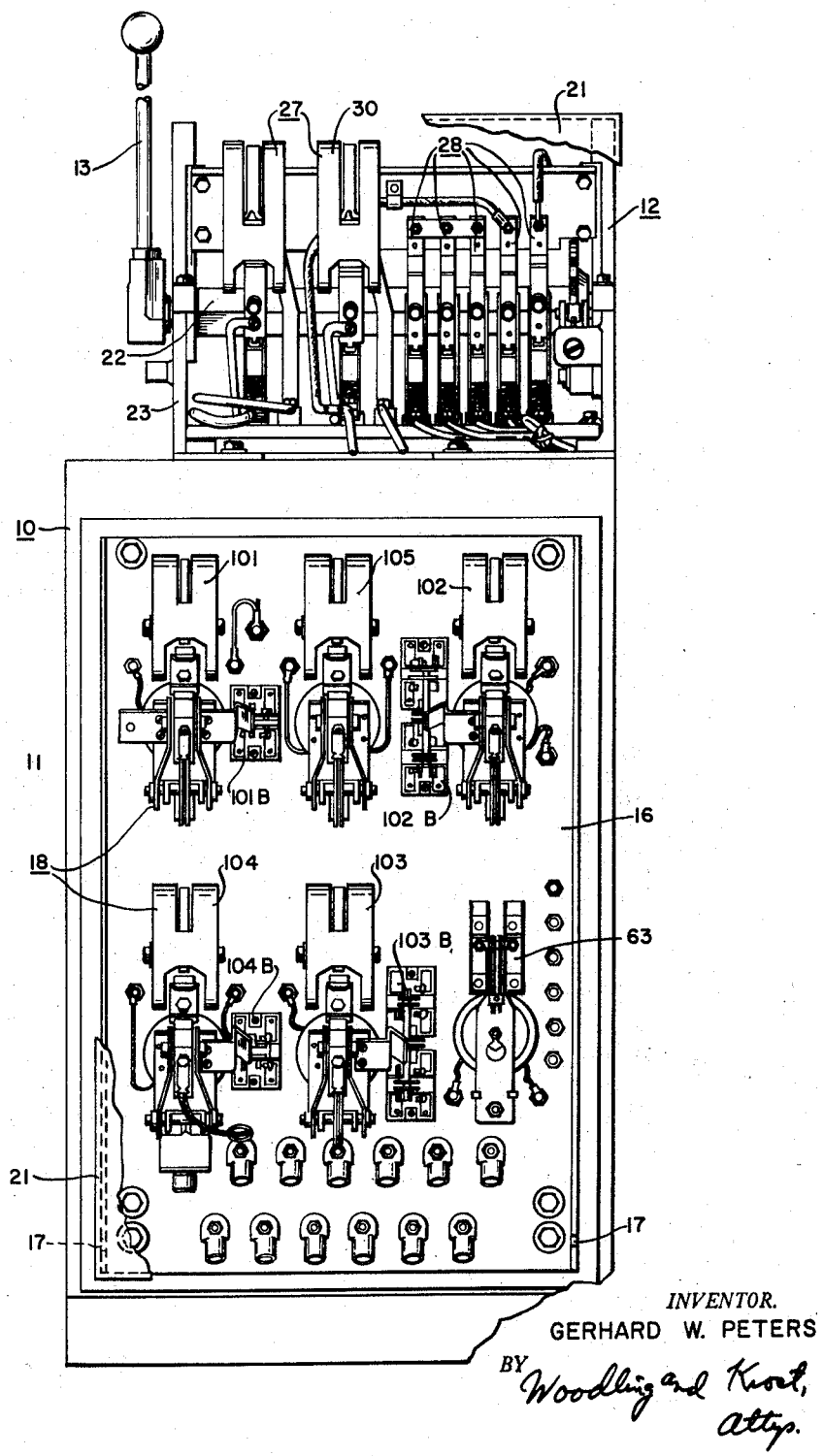

March 1, 1960  G. W. PETERS  2,927,256
ELECTRIC CONTROLLER
Filed Dec. 14, 1954  5 Sheets-Sheet 1

INVENTOR.
GERHARD W. PETERS
BY Woodling and Krost,
attys.

INVENTOR.
GERHARD W. PETERS

United States Patent Office 2,927,256
Registered Mar. 1, 1960

2,927,256
ELECTRIC CONTROLLER
Gerhard W. Peters, Akron, Ohio
Application December 14, 1954, Serial No. 475,217
7 Claims. (Cl. 317—157)

The invention relates in general to electric controllers for control of electric loads, such as motors, and more particularly to a safety feature in the construction of the electric controller wherein it is simplified for more positive actuation yet retaining full flexibility in the control of forward and reverse energization conditions of the motor as well as acceleration and deceleration conditions.

The art of control apparatus has disclosed many forms of electric controllers, the first of which being the manual controller for an electric motor, for an example a direct current motor, with the manual controller having a handle movable in opposite directions from a neutral position for forward and reverse energization of the motor with the handle directly actuating power contacts for control of the motor current.

The full magnetic type of controller has in many cases superseded the manual type, and in such case a control handle is again movable by an operator in forward and reverse directions from a neutral off position, but in such case controls only the actuation of control switch contacts of light amperage duty, and these contacts selectively energize magnetic contactors wherein magnet coils actuate power contacts which handle the actual motor current. In this full magnetic type of controller, a main contactor is generally used to control the main energization to the motor and also forward and reverse magnetic contactors are used to select the reversible energization condition. Additional acceleration contactors are used to control the amount of resistance in the circuit to control the acceleration conditions. The use of all of these contactors results in a large, bulky and costly controller and has the disadvantage that if the main, forward and reverse contactors fail to open, the circuit upon the handle being moved to the off position through a fault of any kind, then the motor will remain connected to the line for a dangerous operating condition.

An object of the invention therefore is to include the advantage of the magnetic type of electric controller as to flexibility and automatic features of operation and rapidity of operation of the contacts, yet to retain much of the compactness and simplicity of the manual type as well as the advantage of the positive actuating of contacts controlling the motor current as found in the manual type.

Another object is to provide a means of controlling a motor by means of a manually operated power switching device in conjunction with a magnetic panel so as to eliminate destructive arcing characteristics of such manually operated controllers.

Another object of the invention is to provide a safety control feature on an electric controller wherein manually operated power contacts may be used to interrupt the motor current even should a main magnetic contactor fail to interrupt the current.

Another object of the invention is to provide a manual handle which actuates both power contacts and control contacts so that the control contacts actuate a main magnetic contactor to interrupt the circuit and then the manual power contacts are opened; and hence, there is no burning or pitting of these manual power contacts, yet they are available as a standby safety feature in the event the magnetic contactor fails to operate properly. Also in such case, another feature of the invention is to provide a means to effect the extremely rapid operation of the magnetic contactor so that the main contacts thereof will definitely be operated to the open position before an operator can manually open the manual power contacts no matter how quickly he moves the operating handle. This assures the successful operation of the controller so that the safety feature is always available in the rare case where it is needed.

Figure 2:
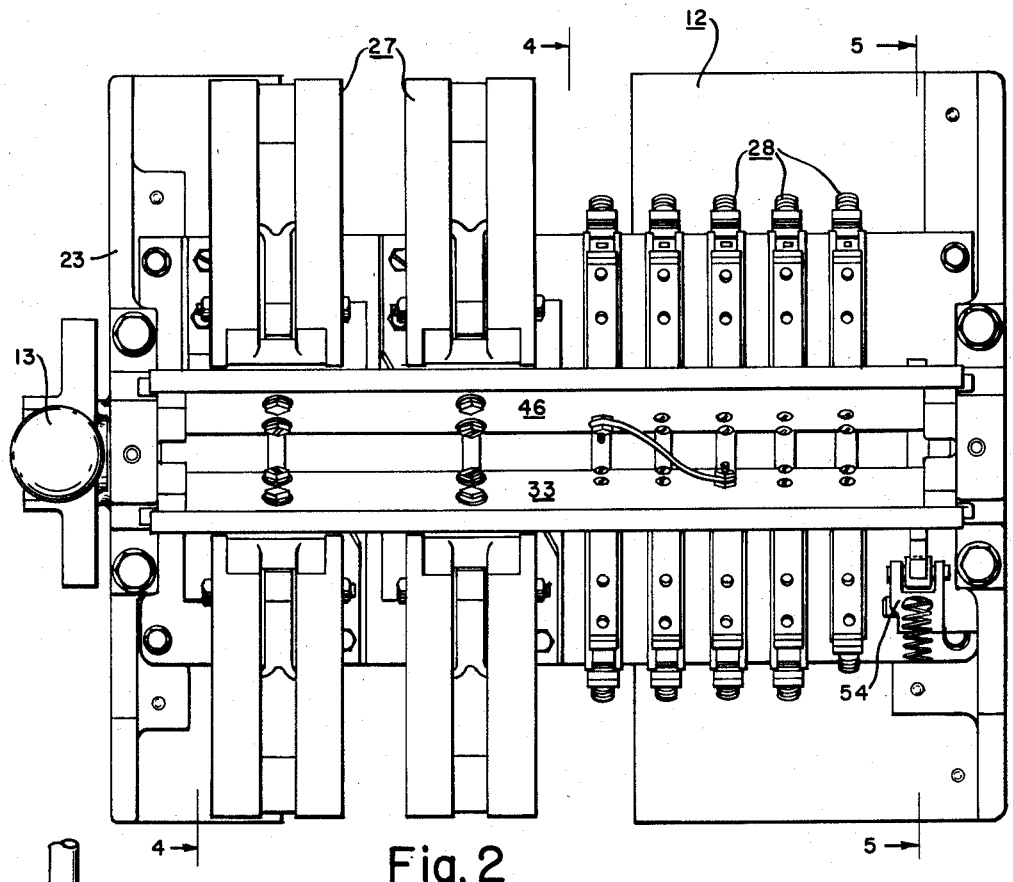
Figure 3:
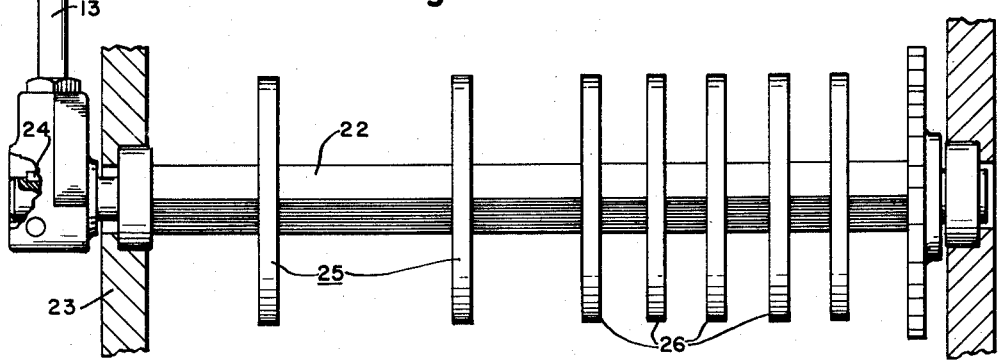
Figures 4, 5:
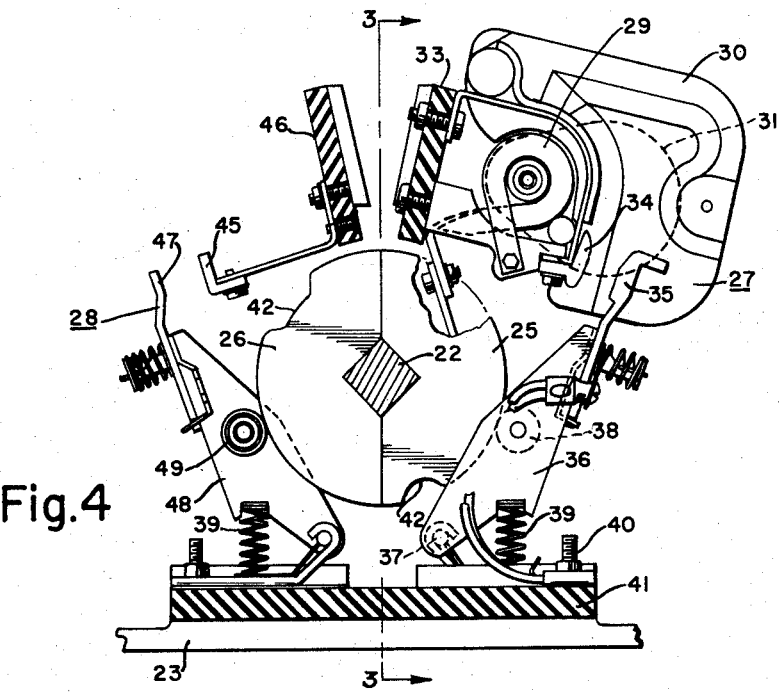
Figure 6:
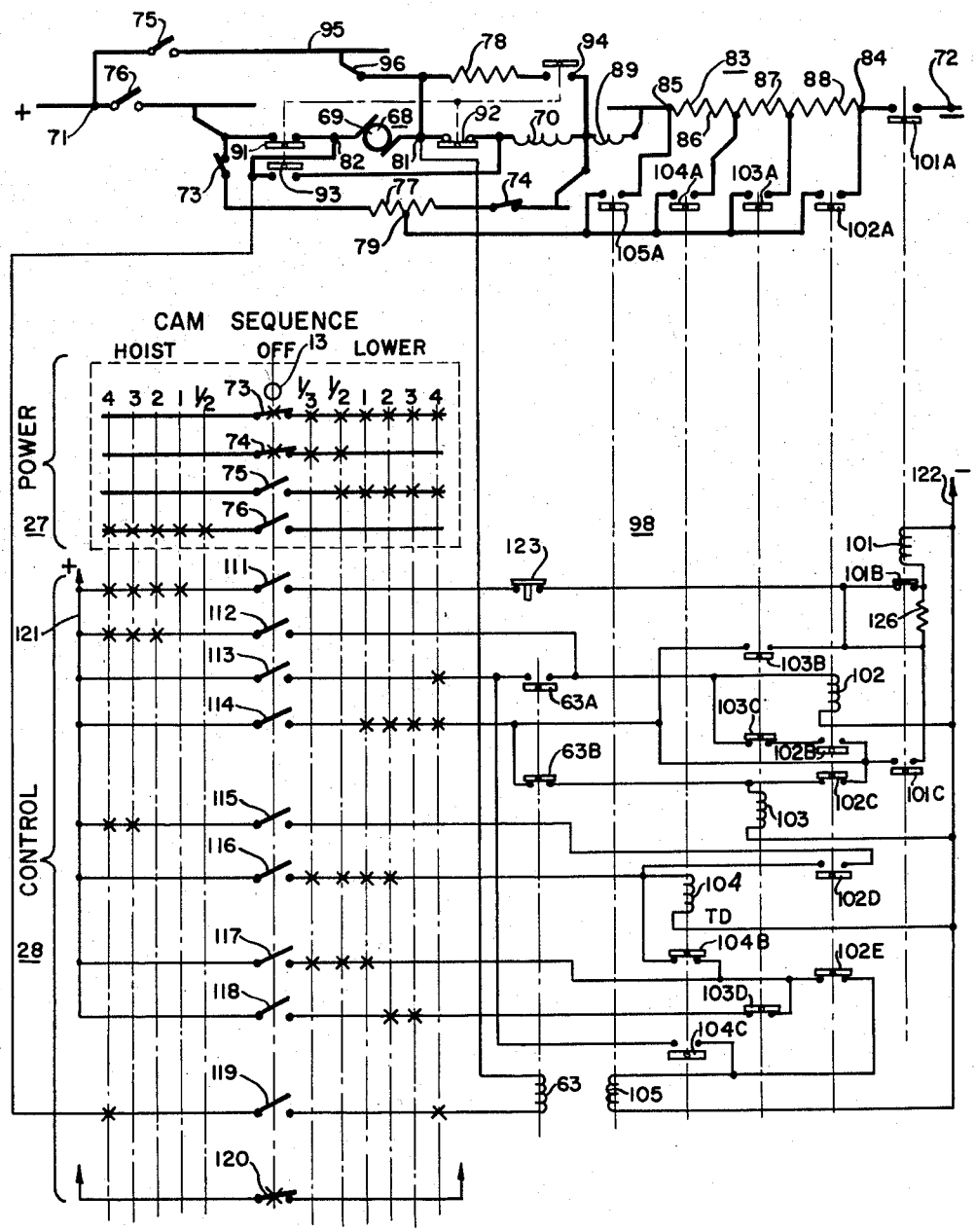
Figure 7:
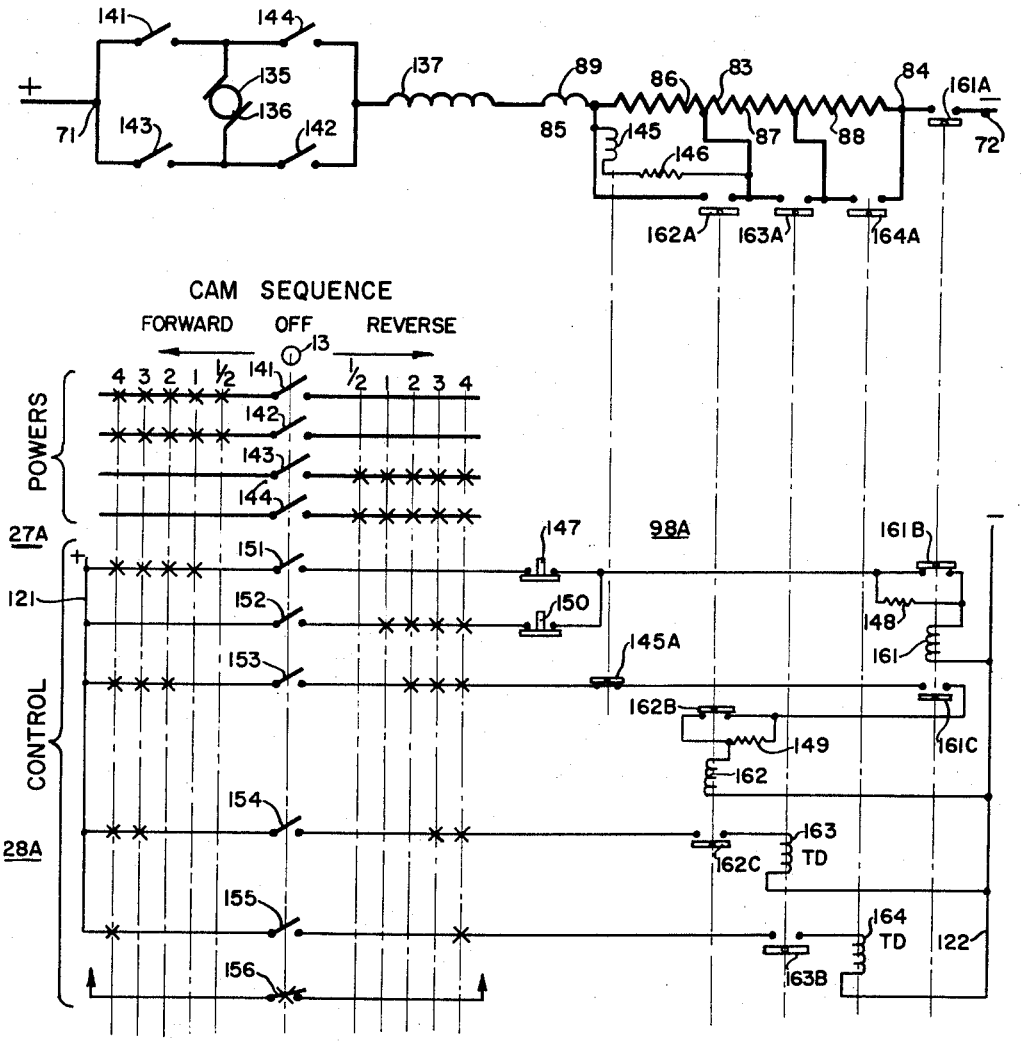
Figure 8:
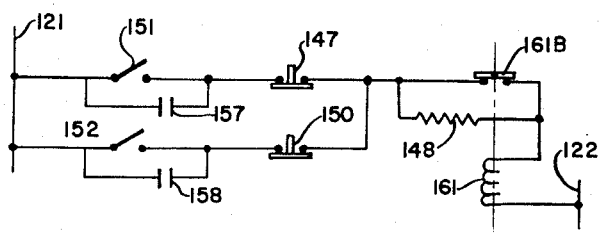

Other objects and a fuller understanding of this invention may be had by referring to the following description and claims, taken in conjunction with the accompanying drawings, in which:

Figure 1 is a front elevational view of the electric controller with the covers broken away to expose the operation mechanism;
Figure 2 is a top view of the master controller;
Figure 3 is a partial side view showing the master controller shaft and cams;
Figure 4 is a sectional view of the cams and switch contacts on the line 4—4 of Figure 2;
Figure 5 is a view showing the detent mechanism on the line 5—5 of Figure 2;
Figure 6 is a schematic diagram illustrating one embodiment of the invention on a dynamic lowering circuit;
Figure 7 is a schematic diagram of another modification of the invention used with a reversing-plugging circuit; and
Figure 8 is a schematic diagram of a part of the circuit illustrating another modification of the invention.

The Figures 1 to 5 show the physical construction of the electric controller 10 which includes a cabinet 11 and a master controller 12 having an operating handle 13. The master controller 12 is mounted atop the cabinet 11 at a convenient height for the operator to grasp the operating handle 13. The electric controller has special adaptability for use in electric overhead traveling cranes which have an operator's cab suspended on the crane girder. Usually three such electric controllers are supplied in the operator's cab, one for each of three motors. The first controller would control forward and reverse traversing of the entire crane along the elevated runway. The second would control a motor for moving the trolley back and forth across the crane girder and the last controller would be to control the motor for hoisting and lowering the load. This last controller would have forward and reverse positions of the operating handle 13; however, these control hoisting and lowering conditions of the electric motor with the lowering conditions frequently operating on an overhauling load due to the mechanical load on the crane hoist. As such, this hoist and lowering electric controller is generally different from the first two controllers by providing a dynamic braking or dynamic lowering loop circuit for the direct current electric motor which will actually deliver power back to the electrical source or power system.

The present invention is equally applicable to both types of controllers; namely, the dynamic lowering electric controller or the controller for traverse of the crane or trolley. This latter controller generally incorporates a reversing-plugging circuit for forward and reverse movements of the electric motor.

The Figures 1 to 5 illustrate the somewhat more complex construction of the electric controller for the dynamic lowering circuit arrangement, but it will be understood that changes and simplifications can be made for the construction of the reversing-plugging electric controller.

The cabinet 11 contains a contactor panel 16 pivotally mounted at 17 within the cabinet 11 so that the entire panel 16 may be tilted forward on the pivot for access to the rear of the panel; and hence, the entire cabinet 11 may be mounted with its back against a wall of the operator's cab for maximum space utilization. The contactor panel 16 carries a plurality of magnetic contactors 18 for control of the load or motor current.

The master controller 12 is shown with its protective cover 21 broken away in Figure 1 to reveal the inner mechanism. This master controller is better illustrated in Figures 2 to 5 and includes a cam shaft 22 journaled in a frame 23. The operating handle is connected as by a key 24 to rotate the cam shaft 22. The operating handle 13 controls a first set of cams 25 and a second set of cams 26. These cams actuate power switches 27 and control switches 28, respectively. The power switches 27 may be similar to the magnetic contactors 18 yet not having the magnet or pull-in coil although retaining the arc blowout coil 29, the arc chute 30, and the flux plates 31 as best shown in Figure 4. The retention of these structural features assures that the power switches 27 are able to interrupt large values of current.

The Figure 4 shows on the right half thereof one of the power switches 27 and on the left half thereof one of the control switches 28. The construction of all power switches 27 may be identical; hence, only one will be described. One of the first set of cams 25 actuates each of the power switches 27 which include a fixed contact 34 and a movable contact 35. The fixed contact 34 is carried by an insulating plate 33 and the movable contact is carried on a switch arm 36 composed of two separate plates straddling the corresponding cam 25. The switch arm 36 is pivoted at 37 and journals the cam roller 38 for engagement with the cam 25 under the urging of a spring 39. The movable contact 35 is provided with an electrical terminal 40 mounted on an insulating plate 41 carried on the frame 23. The fixed contact 34 is connected in series with the arc blowout coil 29.

The left side of Figure 4 shows one of the control switches 28, which may all be identical, and the construction is similar to that of the power switches 27 yet of lighter duty construction since only small amperage currents are controlled, for example, control of the current to the magnet coil of the magnetic contactors 18. The control switch includes a fixed contact 45 mounted on an insulating plate 46 and which may be contacted by a movable contact 47 carried on a switch arm 48 similar to the switch arm 36. The switch arm 48 has its cam roller 49 actuated by one of the second set of cams 26.

The Figure 5 best shows a detent mechanism 54 for establishing relative positions of the handle 13 and the frame 23. This detent mechanism includes a detent wheel or star wheel 55 and a detent roller 56 carried on a lever 57 and urged against the detent wheel 55 by a spring 58. The detent wheel 55 has a central neutral position 59 for an off position of the handle and hence the wheel may be moved in alternate directions from this neutral position to a total of four positions on each side of neutral.

The sets of cams 25 and 26 have notches 42 disposed on their periphery to permit the springs 39 to close the associated power or control switch. Each of the cams controls two switches, one on each side of the cam shaft 22.

The Figure 1 shows that the cabinet 11 contains five of the magnetic contactors 18 and one relay 63. The Figure 6 illustrates schematically the connection of the various structural elements in the Figures 1 to 5 for a dynamic lowering electric controller which may be used with an overhauling load, for example, the hoist motor of an electric crane. The electric motor is shown at 68 having an armature 69 and a field winding 70. The motor may be energized from a direct current source shown as a positive line terminal 71 and a negative line terminal 72. The power switches 27 are four in number and the manual power contacts thereof have been designated as 73, 74, 75 and 76, respectively. These are shown in their connection in the circuit at the top of Figure 6 and also shown schematically in the cam sequence portion of Figure 6. This cam sequence diagram illustrates the sequence of opening and closing of all of the power and control switches 27 and 28. The motor 68 is equipped with a dynamic braking resistance 77 and an additional load resistance 78, with the resistance 77 having a tap 79 connected through a contact 102A to the resistance terminal 84. The armature 69 has terminals 81 and 82, and an acceleration resistance 83 is also provided having end terminals 84 and 85 as well as intermediate terminals establishing sections 86, 87 and 88 thereof. A series brake coil 89 is also provided to magnetically release a spring operated brake on the crane hoist. A power limit switch having two normally closed contacts 91 and 92 and two normally open contacts 93 and 94 may also be provided, as shown.

The motor 68, load resistance 78 and power limit switch 91—94 is adapted to be mounted as a unit upon the trolley of the crane, and as a result four trolley bars, for example, shown at 95, with associated trolley shoes, for example, shown at 96, are used to provide energization to this motor 68 as it moves across the crane girder.

When the manual power contacts 76 are closed, a circuit is provided for the hoisting direction which circuit is established from the positive line 71 through the limit switch contacts 91 and 92, the armature 69, the field 70, the series brake coil 89, the acceleration resistance 83, and a main contact 101A to the negative line 72.

The lower portion of Figure 6 shows the control circuit 98 which includes the magnetic contactors 18 and a relay 63. The magnetic contactors 18 are five in number designated with reference numerals 101 to 105, respectively. Each of these magnetic contactors has a first normally open contact 101A through 105A, respectively, to control motor current. The contactors 101 to 104 have additional control contacts which may be light duty contacts for control purposes, and are shown as connected to the side of the respective contactor in Figure 1. The contactor 101 is a main contactor and actuates the main contact 101A controlling energization to the motor 68. As such it is in series with the selected one of the manual power contacts 75 and 76.

The control switches 28 include ten individual control contacts as physically shown in Figure 2 and as schematically illustrated in Figure 6. These control contacts have been designated as numerals 111 to 120, respectively. The control circuit 98 is energized through control lines 121 and 122. The contactors 102—105 may be termed resistance or acceleration contactors and control the insertion of the various sections 86 to 88 of the acceleration resistance 83.

The cam sequence diagram shown of Figure 6 shows the hoist and lower positions of the handle 13 as being four in number plus additional positions marked as ½ and ⅓. When the detent roller 56 is at the neutral position 59, this is the central or off position as shown in Figure 6. When the handle 13 has been moved so that the detent roller 56 engages the notch 60, this is the first lowering position. The handle 13 will stay in this position or in any one of the detent notches of the wheel 55. The ½ and ⅓ positions are not really physical detent positions, but are electrical positions at which certain switches are actuated. On the Figure 5, the ⅓ position is shown at 61 and the ½ position is shown at 62. In the cam sequence diagram, x's have been placed on the lines for each of the several power and control switches 27 and 28 and such an x means that the respective switch contact is closed when the cam and operating handle 13 are in that particular position.

OPERATION

The arrangement of the control circuit 98 may best be understood from a description of the operation. The handle 13 when in the off position shows that the manual power contacts 73 and 74 are closed. This establishes a dynamic braking loop circuit through the armature 69, limit switch contact 91, manual power contact 73, the dynamic braking resistance 77, manual power switch 74, the field winding 70, and the limit switch contact 92 back to the armature 69. When the handle is moved toward the first hoist position, the cam sequence diagram shows that the manual power contacts 73 and 74 are opened. Next, at the ½ position, the manual power contact 76 is closed to establish the forward or hoisting energization condition of the motor 68. As the detent roller 56 drops into the first position notch 60, the control contact 111 is closed. Assuming that the up limit switch 123 is closed, the main contactor 101 is energized from the control lines 121 and 122 through the normally closed contact 101B of the main contactor 101. These control lines 121 and 122 may carry, for example, 230 volts and in this invention the magnet coil of the contactor 101 is designed for a lower voltage operation, such as 110 volts. The voltage dropping resistor 126 is connected in parallel with the contacts 101B so that as soon as the contactor 101 is energized, the contacts 101B open and the voltage dropping resistor 126 is connected in series with the magnet coil of the contactor 101. This voltage dropping resistor preferably has sufficient resistance to develop about 150 volts thereacross, leaving the magnet coil energized with about 80 volts. This is an important feature in the satisfactory operation of the electric controller 10 of this invention, since the main contactor 101 is energized initially with a much higher than rated voltage for extremely fast actuation or pull-in, whereas it is held energized with a voltage less than rated so that upon deenergization of the contactor magnet coil, the inductive energy of the magnet coil will rapidly be dissipated in the small arc at the opening of the control contact 111; and hence, the main magnetic contactor 101 will rapidly be deenergized to open the main contact 101A. This assures extremely rapid make and break of the contact 101A relative to the make and break of the control contact 111. In practice, this has been found to be about .04 second, which is much quicker than an operator can move the operating handle 13.

Energizing the magnet coil of the contactor with twice rated voltage is a way to effectively reduce the ratio of inductance to resistance to one-fourth what it would be if energized with rated voltage, hence the contactor effectively is four times as fast in actuation.

This feature assures that as the operator moves the handle 13 from the off to the first position, the manual power contact is first closed to set up the selected energization current of the motor 68 and next the main contact 101A is closed to actually pass current through the manual power contacts 75 or 76. Also, as the handle 13 is moved from the first position back to the off position, the contact 111 opens, the small stored energy in the main contactor magnet coil is rapidly dissipated, and the main contact 101A is opened prior in time to the opening of the manual power contacts 75 or 76. This assures that the heavy load currents of the motor 68 are interrupted by the main magnetic contactor 101 and are not normally interrupted by the manual power contacts. Nevertheless, the manual power contacts 75 and 76 are in series with the main contacts 101 and they are always available as a safety feature to interrupt the current should some fault occur to cause freezing or welding of the contacts 101A and thus give positive assurance that the motor 68 will be de-energized. Also, the manual power contacts 75 and 76 are provided with the arc blowout feature 29—31 provided in the magnetic contactors 18, and thus are much superior to ordinary manual switches in that these manual power contacts will handle and safely interrupt large values of current.

The energization of the main magnetic contactor 101 closes the main contact 101A to provide energization from the positive line 71 through the manual power switch 76, limit switch contact 91, armature 69, limit switch contact 92, the series field 70, the series brake 89, and the entire acceleration resistance 83. This establishes a slow speed hoisting condition. The energization of the series brake coil 89 releases the spring urged brake on the hoist so that the armature 69 may turn. In this first hoist position, the acceleration contactor 103 is also energized through the contacts 101C, 102C and 63B to close contacts 103A. However, closure of these contacts does not affect the motor operation since the manual power contacts 73 and 74 are open.

In the second hoist position, the main contactors 101 and 103 remain energized and the control contacts 112 are closed to energize the acceleration contactor 102. The contacts 102A thereof close to short the resistor section 88. This increases the energization to and speed of the motor 68. The contacts 102B close, but the contacts 103C have previously been opened, so there is no change in the control circuit.

In the third hoist position contactors 101, 102 and 103 remain energized and the control contacts 115 are closed to energize the acceleration contactor 104 through contacts 102D. This acceleration contactor 104 is preferably of the time delay type which closes the contacts thereof after suitable time delay in the energization of the magnet coil. Such time delay contactor may be the type shown in the copending application Serial No. 346,552, filed April 3, 1953, by M. W. Griffes and C. W. Merchant. After this suitable time delay period, the contacts 104A of this contactor 104 close to additionally short the resistor section 87 and again increase the speed of the armature 69.

In the fourth hoist position, contactors 101—104 remain energized and the control contacts 119 are closed to connect the relay 63 across the armature 69. When the armature 69 has accelerated to a sufficient speed so that the voltage across the armature 121 has been increased to a predetermined value, the relay 63 is actuated to close contacts 63A to thus energize the contactor 105 through the previously closed contacts 104C. This shorts the remaining resistor section 86 for the highest hoisting speed condition.

As the operating handle 13 is returned to the off position, the acceleration contactors are deactuated in the reverse sequence, thus progressively inserting sections of the acceleration resistance 83 to decrease the speed of the armature 69. As the handle 13 passes the first position, the main contactor is de-energized to open the main contacts 101A prior in time to the opening of the manual power contacts 76 at the off position. As the handle 13 reaches the off position, the manual power contacts 73 and 74 are closed to again establish the dynamic braking loop circuit. Also, the series brake coil 89 is de-energized to set the spring operated brake.

If the motor 68 is operated in the hoist direction to its upper limit position, the control limit switch 123 is actuated to de-energize the main contactor 101 and thus stop the armature 69. The armature 69 may then not be run any farther in the hoist direction but may be lowered as hereinafter described.

The limit switch contacts 91—94 are power limit contacts which normally are used only in an emergency in case the control limit switch 123 should fail in its operation. Actuation of the power limit switch contacts 91—94 opens the circuit from the power line to the motor 68 and establishes a dynamic braking loop circuit from the armature terminal 82 through the limit switch contact 93, the field 70, the limit switch contact 94, the load resistor 78, and return to the armature terminal 81.

Also, the series brake coil 89 is de-energized under these conditions to set the spring operated hoist brake.

The lowering operation is achieved by moving the handle 13 in the lowering direction from neutral. As the handle is moved to the first lowering position, it first passes through the ⅓ and ½ positions. It will be noted from the cam sequence diagram that control contacts 116 and 117 are closed in the ⅓ position, while the manual power contacts 73 and 74 remain closed. Closing of the control contacts 117 energizes the acceleration contactor 105 through contacts 102E to close contact 105A. This establishes a connection between the dynamic braking resistance tap 79 and the acceleration resistance terminal 85 so that when the manual power contacts 74 are opened after the ½ position is passed, there will still be established a dynamic braking loop circuit from the armature 69 through manual power contacts 73, part of the dynamic braking resistance 77, contacts 105A, the series brake coil 89, and the field winding 70 to return to the armature 69. This makes certain that in the off position and in all lowering positions there is constantly maintained a dynamic braking loop circuit.

In the ½ lowering position, the manual power contacts 75 are closed prior to the opening of the manual power contacts 74. By the time the manual handle 13 has reached the first lowering position, which is a physical position giving a detent indicating to the operator, the manual power contacts 75 have been closed and next the manual power contacts 74 have been opened to determine the reverse or lowering energization conditions of the motor 68.

At the first lowering position, the control contacts 114 are closed to energize the contactor 103 and subsequently the main contactor 101 through the contacts 103B. This closes the contacts 101A and 103A to energize the motor 68 through the acceleration resistance section 88. Thus, the main contactor 101 will be energized whether or not the control limit switch 123 is actuated. Control contacts 116 are also closed in the ⅓ position to energize the time delay contactor 104. After the time delay interval, the contacts 104A thereof close to short the resistance section 86 to increase the energization to the motor 68 and increase the lowering speed thereof.

If the power limit switch 91—94 has been actuated previously and the hoist is lowering out of this condition, then the motor 68 is energized as a series motor with the load resistance 78 in parallel with the armature 69 and field 70 in series. When the power limit switch 91—94 resets, the motor 68 is energized as a shunt motor with a part of the dynamic braking resistance 77 in series with the armature 69.

In the second lowering position, the contactors 101, 103 and 104 remain energized; however, the control contacts 117 open to de-energize contactor 105 and to insert the resistance section 86 in series with the field winding 70 to increase the lowering speed.

In the third lowering position, contactors 101 and 103 remain energized and control contacts 116 open to de-energize contactor 104 and to thus insert the entire acceleration resistance 83 in series with the field winding 70 to further increase the lowering speed.

In the fourth lowering position, the main contactor 101 remains energized, the control contacts 118 are opened, and the control contacts 113 and 119 are closed. This connects the relay 63 to the armature 69 closing contacts 63A to energize contactor 102. The closing of contacts 102A thereof short the resistance section 88 in series with the armature 69 to still further increase the lowering speed. The opening of contacts 63B and 102C de-energizes contactor 103 to also open contact 103A and thus present shorting of the resistor section 88 for the highest lowering speed.

An important feature of this control is that, should a magnetic contactor coil fail while using the control in the lowering direction, the circuit is so designed that the dynamic lowering loop is maintained, giving the operator complete control of the load. The complete circuit, as shown in Figure 6, is dependent on the operation of contactor 103 in the lowering direction. If the coil of contactor 103 has failed, the controls may be operated in the hoisting direction but will not operate if the controller handle 13 is moved in the lowering direction. On the first lowering position, contactors 105, 104 and 103 are energized through contacts 117, 116 and 114, respectively, setting up the dynamic lowering loop. If the coil on contactor 103 has failed, the contactor will not be actuated; therefore, main contactor 101 will not be actuated because contact 103B will not have been closed, control will not function and power will not be applied to the motor. Failure of the coil on contactor 103 while running on any of the first three lowering positions will not result in loss of the dynamic lowering loop. If the master controller is on the second or third lowering position and the coil of contactor 103 fails, the contactor 105 will operate due to the closing of contact 103D and the contact 118 of the master controller. Contact 118 of the master controller is necessary for the successful operation of the above mentioned safety feature. If the coil on contactor 102 or the coil on relay 106 fails, the control will automatically return to, or will not go beyond, the third speed condition.

The handle of the master controller may be returned from the fourth, or other positions lower, to the off position, and the magnetic contactors are deactuated in the reverse order of that mentioned above, with the contact 101A of the main contactor 101 being opened before the manual power contact 75 is opened and contact 74 is closed. As manual power contact 74 is being closed, contactors 104 and 105 are being deactuated by the opening of contacts 116 and 117 keeping the dynamic braking loop intact and dynamic braking is then applied in the off position. The power contacts and blowout assemblies of the master controller are capable of interrupting the power arc, if required, due to freezing or welding of contacts of the magnetic contactors.

The optional control contact 120 is normally closed in the off position and may suitably be used for remote control purposes, for example, to determine that the operating handle 13 is in an off position.

*Figure 7*

The Figure 7 illustrates schematically a reversing-plugging type of electric controller which may be used for both forward and reverse drive of an electric motor, such as may be used on the trolley traverse or bridge drive of an electric traveling crane. The electric controller may be similar to that shown in Figures 1 to 5, but may be simplified by the use of only four magnetic contactors 18 and the use of only six control switches 28.

In the schematic diagram of Figure 7, a motor 135 is shown having an armature 136 and a field 137. The series brake coil 89 may again be used as well as the accelerating resistance 83 to be energized from the line 71—72. The motor 135 may be energized through forward manual power contacts 141 and 142 or energized through reverse manual power contacts 143 and 144. These contacts are also shown schematically in the cam sequence portion of the Figure 7. This cam sequence portion again illustrates that these manual power switches are open in the off or neutral position with the forward manual power contacts being closed in all forward positions and the reverse manual power contacts being closed in all reverse positions. The power switches are here designated by the reference numeral 27A and the control switches by reference numeral 28A. The control circuit 98A utilizes six control contacts numbered 151 through 156, respectively. The control contact 156 may again provide remote control indication. A plugging relay 145 is conected in series with a dropping resistor 146 and connected across the resistance section 86. The contactor panel 16 for this circuit of Figure 7 would contain four magnetic contactors 161 to 164, respectively. The contactor 161 is a main contactor controlling energization to the motor 135 and the contactors 162 to 164 are acceleration contactors controlling selective amounts of resistance in series with the motor 135 for various acceleration conditions. The contactors 161–164 control contacts 161A–164A for controlling the motor current, and also have additional control contacts.

*Operation of Figure 7*

The circuit arrangement of Figure 7 may best be understood from a description of the operation. The cam sequence diagram again illustrates the various forward and reverse positions in which the power and control switches are open and closed, with the *x*'s on this diagram again indicating that a given switch contact is closed at that position. As the operating handle 13 is moved from the off position to the first forward position, the detent roller 56 first passes a half-way point at about point 62 whereat the forward manual power contacts 141 and 142 are closed. This sets up the selected energization condition of the motor 135. In the first forward position, control contacts 151 are closed to energize the main contactor 161 through a forward limit switch 147 and contacts 161B. A voltage dropping resistor 148 is connected in parallel with the normally closed contacts 161B to again limit the voltage applied to the magnet coil of the contactor 161 as soon as it has been energized. This voltage dropping resistor 148 is thus similar in purpose and function to the voltage dropping resistor 126 in Figure 6.

In the first forward position, the motor 135 is thus energized as a series motor through the entire acceleration resistance 83. In the second forward position, the contactor 162 is energized by the closing of the control contacts 153, normally closed contacts 145A, and the now closed contacts 161C. Contacts 162B are in series with the magnet coil of contactor 162, thus these open to again insert in series with the magnet coil a voltage dropping resistor 149. The energization of the contactor 162 closes contacts 162A to short resistor section 86 and increase the forward speed of the motor 135.

The third forward position closes control contacts 154 to energize contactor 163. This is dependent upon the prior closing of contact 162C. The contactors 163 and 164 are preferably of the time delay type which may be of the type in the aforementioned application Serial No. 346,552. After a suitable time delay after energization, contactor 163 is actuated to close contact 163B. Actuation of the contactor 163 closes contacts 163A to short resistor section 87, thus increasing the forward speed.

The fourth forward speed condition closes contacts 155, and after contactor 163 has closed contacts 163B, the contactor 164 is energized. After the time delay period, it is actuated to close contacts 164A to short the entire acceleration resistance 83.

As the handle is returned from the fourth or any of the forward positions to the off position, the acceleration contactors are deactuated in reverse sequence to increasingly insert sections of the acceleration resistor 83. In the off position, the series brake coil 89 is again de-energized to again set the spring operated brake.

It will be noted that the forward and reverse cam sequences are symmetrical and thus the actuation of the operating handle in the reverse direction controls the main and acceleration contactors in the same sequence for acceleration in the reverse direction. In the reverse direction, however, the main contactor 161 is energized through the control contacts 152 and through the reverse limit switch 150.

If the optional forward and reverse limit switches 147 and 150 are not used, then it will be seen that two separate control contacts 151 and 152 are not needed; instead contacts 151, for example, may be actuated in all positions on both sides of neutral to energize the contactor 161.

The plugging relay 145 is adjusted for use only should the operating handle be moved rapidly from the forward position to the reverse position or vice versa. When the handle is rapidly moved to the opposite side of neutral, the counterelectromotive force generated in the motor is added to the line voltage to produce a greater than normal voltage drop across acceleration resistor section 86 which energizes the plugging relay 145, opening contacts 145A thereof. This prevents contactor 162 from being energized until the voltage across resistor section 86 is reduced to a value equal to that obtained with only line voltage applied across this resistor section when the motor 135 is at standstill.

The Figure 8 is a modification of a portion of the Figure 7 and shows the contactor 161 with its associated normally closed contacts 161B, the difference over Figure 7 being that condensers 157 and 158 are connected across the manual control contacts 151 and 152, respectively. These condensers are impedances which effectively absorb the energy of the electromagnet or magnet coil of the main contactor 161 upon opening of the respective control contact, thus still further aiding the function achieved by the voltage dropping resistor 148, namely, to make the contactor 161 very fast in operation.

Also, the resistances 126 and 141 reduce the ratio of inductance to resistance over that which would be obtained should a magnet coil of proper voltage rating be used for the voltage on the line 121—122. These impedances thus assure that the contactor 161 will be actuated with extreme rapidity upon energization thereof so that the contact 161A will be closed prior to the closing of the selected manual power contacts; and even more importantly assure that when the contactor magnet coil 161 is de-energized, the armature of this contactor will be deactuated to open the contacts 161A prior in time to the manual opening of the manual power contacts.

The electric controller of the present invention thus results in a simple, compact, relatively inexpensive yet reliable controller, with the full flexibility of operation of the full magnetic type of controller. In addition, the manual operation of the power switches 27 and 27A gives positive assurance that the motor may be disconnected from the line even should some fault occur which maintains closed the main contacts 101A or 161A.

Still further the use of the impedance means, for example, resistor 126, to produce extremely rapid actuation of the main contacts 101A or 161A makes practical the use of the combined manual power contacts 27 and the magnetic contactor main contacts 101A or 161A.

The use of the impedance means, such as the resistors 126 and 148 or condensers 157 and 158 establishes an extremely fast operating time for the main contactors 101 and 161. This assures that the main contacts 101A, for example, will be opened in an extremely short period of time after the opening of the control contacts 111, and will be opened prior to the opening of the manual power contacts. This is an important feature in making certain that the heavy motor current is alway normally interrupted by the main magnetic contactor, rather than by the manual power contacts with consequent burning and pitting. The manual power contacts thus remain in good condition, and together with the arc extinguishing feature 29—31, are always ready for use as a safety feature to interrupt the motor current in the event of failure of the main contacts 101A to interrupt this motor current.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. An electric switch controller, comprising, a cam shaft having first and second cam means, a manual handle connected to said cam shaft to move same in a first path to and from a first position and an off position, a control contact actuated by said first cam means by movement of said shaft in said path, a main magnetic contactor having a main contact, means connecting said control contact to said magnetic contactor to control same, manual power contacts actuated by said second cam means by movement of said shaft in said path, circuit means effectively connecting in series said manual power contacts and said main contact, and the physical positioning of said first and second cam means relative to said control and manual power contacts establishing actuation of said manual power contacts with lesser movement of said shaft in said path from said off position toward said first position than required to establish actuation of said control contact, whereby the manual power contacts are relieved of making and breaking current in said circuit means and yet provide a safety feature of establishing positive opening of said circuit means even though said main contact of said main magnetic contactor fails to interrupt the circuit.

2. An electric switch controller, comprising, a frame, a cam shaft having first and second cam means and journalled in said frame, a manual handle connected to said cam shaft to arcuately move same in opposite directions from a neutral position, first and second control contacts actuated by said first cam means in said opposite directions of movement, respectively, a main magnetic contactor having a main contact, means connecting said first and second control contacts to said magnetic contactor to control actuation of same, a first and second reversing manual power contacts manually actuated by said second cam means by said arcuate movement of said cam shaft, circuit means effectively connecting in series said main contact and selectively said first and second reversing manual power contacts, and the physical positioning of said first and second cam means relative to said control and manual power contacts establishing actuation of said manual power contacts with lesser arcuate movement of said handle in either direction from neutral than required to establish actuation of said first and second control contacts, whereby manual selection is made of the desired direction of current flow in said circuit means prior in time to establishment of actual current flow by said main magnetic contactor through said manual power contacts, and conversely the actual current flow through the manual power contacts is interrupted by said main magnetic contactor prior in time to the opening of said manual power contacts, such that the manual power contacts are relieved of making and breaking the current and yet provide a safety feature of establishing positive opening of the said circuit means even though said main magnetic contactor fails to interrupt the circuit.

3. A safety switch controller, comprising, a frame, a cam shaft journalled in said frame and having first and second cam means rotatable therewith, a manual handle connected to arcuately move said cam shaft in a first path in first and second alternate directions from a neutral off position, a detent mechanism connected between said frame and said shaft, said detent mechanism establishing said neutral off position and at least a first detent position in each of said alternate directions of movement in said path, a main magnetic contactor having a main contact, control contact means alternately actuated by said first cam means in said first detent positions, means connecting said control contact means to said magnetic contactor to control actuation of same, forward and reverse manual power contacts, circuit means effectively connecting in series said main contact and selectively said forward and reverse manual power contacts, and means for mechanically actuating said forward and reverse manual power contacts from said second cam means by movement of said shaft in said path at positions intermediate said off and first detent positions, whereby an operator moving said handle shaft in said path in either direction from neutral first manually selects the current flow direction and next establishes actual current flow all with but a single detent sensory indication imparted to the operator, and whereby as the handle is returned to the off position the magnetic contactor normally first interrupts the current flow and next the manual power contacts are opened, yet the operator is able to manually interrupt the power circuit should the magnetic contactor fail.

4. An electric switch controller, comprising, a frame, a cam shaft having first and second cam means and carried in said frame, a manual handle connected to said cam shaft to move same in a first path in opposite directions from a central off position, control contact means actuated by said first cam means in either direction of movement of said shaft in said path, a main magnetic contactor having a main contact, means connecting said control contact means to said magnetic contactor to control actuation of same, first and second reversing manual power contacts manually controlled by said second cam means in opposite directions of movement of said shaft in said path, circuit means effectively connecting in series said main contact and selectively said first and second reversing manual power contacts, and said cam means being physically positioned relative to the respectively actuable contacts to establish actuation of said manual power contacts with lesser movement of said cam shaft in said first path in either direction from said central off position than required to establish actuation of said control contact means, whereby manual selection is made of the desired direction of current flow prior in time to establishment of actual current flow by said main magnetic contactor.

5. An electric switch controller, comprising, a manual master controller having on and off positions, a control contact and a manual power contact, means for mechanically actuating said contacts from said master controller in movement in a first path toward said on position, a main magnetic contactor having a main contact connected in series with said manual power contact, a magnet coil for said main magnetic contactor, impedance means connected to said magnet coil to establish fast actuation thereof, and the position of said control and power contacts relative to said master controller establishing that movement in said path of said manual master controller to the off position provides first an opening of the control contact and second the opening of the manual power contact with said impedance means establishing opening of said main magnetic contactor main contact prior to the opening of said manual power contact.

6. An electric switch controller, comprising, a manual master controller having forward and reverse positions and an intermediate off position, control contact means and forward and reverse manual power contacts, means for mechanically actuating said forward and reverse contacts and said control contact means from said master controller by movement thereof in a first path toward said forward and reverse positions, respectively, a main magnetic contactor having a main contact connected in series with a selected one of said manual power contacts, an electromagnet for said main magnetic contactor and having a given voltage rating, a normally closed contact of said main magnetic contactor connected in series with said electromagnet, a first impedance connected in parallel with said normally closed contact, capacitive impedance means connected across said control contact means, means for energizing said electromagnet through said control contact means from a voltage exceeding said given voltage rating for fast actuation thereof, said first impedance developing a voltage thereacross in series with said electromagnet upon energization thereof, the movement of said manual master controller in said path to the off position from either forward or reverse position establishing first an opening of the control contact means and second the opening of the respective manual power contact with said impedances establishing opening of said main magnetic contactor main contact prior to the opening of said manual power contact.

7. An electric switch controller, comprising, a manual master controller having forward and reverse positions and an intermediate off position, first and second control contacts and forward and reverse manual power contacts, means for mechanically actuating said contacts from said master controller by movement thereof in a first path toward said forward and reverse positions, respectively, a main magnetic contactor having a main contact connected in series with said manual power contacts, an electromagnet for said main magnetic contactor and having a given voltage rating, a normally closed contact of said main magnetic contactor connected in series with said electromagnet, a voltage dropping resistor connected in parallel with said normally closed contact, means for energizing said electromagnet through one of said control contacts from a voltage greatly exceeding said given voltage rating for fast actuation thereof, the resistance value of said voltage dropping resistor being such as to lower the voltage applied to said electromagnet to less than said given voltage, the movement of said manual master controller in said path to the off position from either forward or reverse position establishing first an opening of the respective control contact and second the opening of the respective manual power contact with said voltage dropping resistor so reducing the energy stored in said electromagnet as to establish opening of said main magnetic contactor main contact prior to the opening of said manual power contact.

References Cited in the file of this patent

UNITED STATES PATENTS

| | | |
|---|---|---|
| 1,508,236 | Murdock | Sept. 9, 1924 |
| 1,702,075 | Chireix | Feb. 12, 1929 |
| 1,813,181 | MacNeill | July 7, 1931 |
| 1,840,281 | Wright | Jan. 5, 1932 |
| 2,288,133 | Harwood et al. | June 30, 1942 |
| 2,359,478 | Hunter et al. | Oct. 3, 1944 |
| 2,465,086 | Grossen | Mar. 22, 1949 |